US008020810B2

(12) United States Patent  
Dietrich et al.

(10) Patent No.: US 8,020,810 B2
(45) Date of Patent: Sep. 20, 2011

(54) CLAMPING ELEMENT FOR HOLDING AT LEAST ONE OBJECT, IN PARTICULAR A CABLE

(75) Inventors: Mike Dietrich, Bornow (DE); Peter Wandt, Berlin (DE); Hans-Joachim Zschage, Birkenwerder (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 204 days.

(21) Appl. No.: 12/308,020

(22) PCT Filed: May 30, 2007

(86) PCT No.: PCT/EP2007/055220
§ 371 (c)(1),
(2), (4) Date: Apr. 2, 2009

(87) PCT Pub. No.: WO2007/141167
PCT Pub. Date: Dec. 13, 2007

(65) Prior Publication Data
US 2009/0266945 A1   Oct. 29, 2009

(30) Foreign Application Priority Data

Jun. 6, 2006 (DE) .......................... 10 2006 026 250

(51) Int. Cl.
*E21F 17/02* (2006.01)
(52) U.S. Cl. .......................................... 248/63; 248/68.1
(58) Field of Classification Search ............... 248/71, 248/613, 62, 69, 74.1, 74.2, 231.81, 316.2, 248/316.7
See application file for complete search history.

(56) References Cited

U.S. PATENT DOCUMENTS

| 2,650,948 | A |   | 9/1953 | Findlay |
|---|---|---|---|---|
| 3,913,187 | A | * | 10/1975 | Okuda .......................... 24/484 |
| 4,564,163 | A |   | 1/1986 | Barnett |
| 4,635,886 | A |   | 1/1987 | Santucci et al. |
| 4,881,705 | A | * | 11/1989 | Kraus .......................... 248/74.2 |
| 5,626,316 | A |   | 5/1997 | Smigel et al. |
| 5,645,252 | A |   | 7/1997 | Fisher |
| D389,733 | S | * | 1/1998 | Nakamura ..................... D8/396 |
| 7,201,351 | B2 | * | 4/2007 | Stigler ......................... 248/74.1 |

FOREIGN PATENT DOCUMENTS

| DE | 25 05 628 | 8/1975 |
|---|---|---|
| DE | 40 31 237 | 4/1992 |
| DE | 94 05 363 U | 9/1994 |
| EP | 0 681 133 | 11/1995 |
| GB | 2 202 270 | 9/1988 |
| WO | WO 83/00272 | 1/1983 |

* cited by examiner

OTHER PUBLICATIONS

International Search Report PCT/EP2007/055220.

*Primary Examiner* — Amy Sterling
*Assistant Examiner* — Erin W Smith
(74) *Attorney, Agent, or Firm* — James E. Howard; Andre Pallapies

(57) ABSTRACT

A clamping assembly for holding at an object, in particular, a cable, is provided and includes a first part and a second part movable relative to one another between an open position and a closed position. The clamping assembly also includes an elastic element secured to the first part and having a generally arc-shaped deformable portion. The second part has a counter portion with a curvature that generally parallels the curvature of the generally arc-shaped deformable portion of the elastic element. The first part and the second part are securable in the closed position with an object to be held being retained and the generally arc-shaped deformable portion of the elastic element exerting a retaining on the object that is produced by a deformation of the generally arc-shaped deformable portion of the elastic element caused by the object.

26 Claims, 3 Drawing Sheets

CLAMPING ELEMENT FOR HOLDING AT LEAST ONE OBJECT, IN PARTICULAR A CABLE

BACKGROUND OF THE INVENTION

The invention relates to a clamping element for holding at least one object, in particular a cable, with a first part and a second part, where the two parts can be moved relative to one another for the purpose of closing the clamping element, and an elastic element which is arranged on the first part or the second part.

Diverse forms of clamping elements for retaining cables or pipes are known. The German publication of unexamined application DE 36 35 408 A1 discloses a clamp, for holding ribbon cables in position, which includes a lower part on which is provided a latching element for fixing the clamp onto any other object, such as for example a wall or a sheet component. The lower part is joined to an upper part by a film hinge, so that the two parts can move relative to each other for the purpose of closing the clamp, and can be opened and closed by means of a latching fixture with a latch hook and a latch stay. Arranged on the upper part are two elastic elements each of which has an unattached end pointing towards the lower part. When ribbon cables are placed on the lower part and the upper part is then closed, these elastic elements make contact with the ribbon cables, and the closing operation deforms them so that they engage with each other and press onto the flat cables.

Also known, from DE 40 31 237 A1, is a closable pipe or cable retainer made of hard-elastic plastic, having a half-ring shaped lower part with, attached to one side of it by means of a film hinge, an upper part which is also half-ring shaped. On a side opposite to the film hinge, the upper part and the lower part are joined by a latching fixture which can be released, so that the retainer can be closed and opened. The upper part has several elastic elements formed on it, each of which has unattached ends, which distort elastically when a pipe or cable is introduced, and mate onto these objects which are to be held.

These known retainers are relatively costly in concept, and furthermore due to the unattached elastic elements only permit inadequate retention of the relevant objects which are to be retained.

BRIEF SUMMARY OF THE INVENTION

It is therefore the object of the present invention to devise a clamping element which permits improved retention of at least one object.

This object is achieved by a clamping element which has the features as claimed in claim 1.

A clamping element in accordance with the invention for retaining at least one object, in particular a cable, incorporates a first part and a second part which can be moved relative to the first part for the purpose of closing the clamping element, together with an elastic element which is arranged on the first part or on the second part. The elastic element is, at least in some regions, arc-shaped in form and is affixed to one of the two parts by areas of its edges which lie opposite each other, whereby the object can be retained between the elastic element and the other part, to which the elastic element is not affixed. The object is advantageously retained by a retaining force which bears on the object, and which is produced by deformation of the elastic element (5) caused by the object. The direction of curvature of the arc-shaped region of the elastic element is designed to correspond to the direction of the curvature of the arc-shaped region of the other part, facing the object which is to be retained, that is the part on which the elastic element is not arranged. This clamping element is relatively simply constructed, but nevertheless permits a reliable and improved retention of an object. By the mechanically robust affixing of the elastic element, the object can be firmly retained in the clamping element, and in particular between the elastic element and the part to which the elastic element is not affixed. The fact that the curvature of the elastic element and the other part are in the same direction also makes possible a uniform contact with an object, and uniform application of a retaining force.

The clamping element is preferably constructed in such a way that the arc-shaped region of the elastic element extends along the entire length of the arc-shaped region of the part on which the elastic element is not arranged. In particular, this curved region of this elastic element and the part against which the object lies are thus designed to be essentially the same shape.

The part to which the elastic element is affixed preferably has an arc-shaped region which, between the edge areas which are affixed, is curved the opposite way from the elastic region. As a result the elastic element and the part to which the elastic element is affixed have, in particular in these curved areas, a larger gap between them, allowing the elastic element to have increased movability and deformability.

Preferably, a stop element will be formed on one side of that part facing the elastic element to which the elastic element is affixed. This stop element is preferably shaped such that, on the one hand, this part is made mechanically rigid and, on the other hand, it prevents the elastic element from snapping over to a shape in which it is curved in the opposite direction from the original arrangement. The original curvature associated with the basic arrangement of the elastic element can thereby be maintained, and its associated application of pressure on the object which is to be retained can be guaranteed, so that this object can be securely and firmly held.

The first part and the second part are preferably joined on a first side by a latching fixture, so that they can be released, where at least one latching element of this latching fixture is arranged on each part. In addition, it is advantageous that the first part and the second part are joined on a second side, which is opposite the first side, by a film hinge.

Affixed to one of the two parts there is preferably at least one fixing element which enables the complete clamping element to be affixed to an object, such as for example a sheet component or a wall formed in some other way.

The fixing element is preferably in the form of a snap-fit stud. Preferably, the fixing element will be arranged centrally on a part, so as to ensure that the clamping element can be attached to a baseplate or some other backing contour. Here, it is preferable if the baseplate has formed in it an opening area, which can be shaped in diverse ways, into which the fixing element can be introduced. The opening area could, for example, be round or square in shape, where a square opening area could at the same time provide protection against rotation of the fixing element. This joint, between the fixing element and the baseplate or some other object, can also be in the form of a latching fixture, for example with a rotary or snap-fit engagement. Over and above this however, a push-fit engagement, for example over the edge of a thin sheet, fixing by means of plastic screws or by a retaining bracket with self-tapping screws, could also be provided. Equally, however, a form using two latching elements with complementary shapes could be provided, or sheet adapter parts which claw into plastic ribs. Where the demands for mechanical rigidly are small, it would also be possible to use adhesive pads.

The arc-shaped region of the elastic element is preferably formed of pins which are preferably constructed parallel to each other. These pins may be arranged to be equidistant from each other or alternatively also with a varying spacing. Preferably, in the retaining region of the clamping element, these pins will be oriented essentially parallel to the object which is to be retained. The pins will be constructed and arranged on the elastic element in such a way that the object to be retained also deforms at least one pin, which lies against the object, whereby the retaining force is advantageously increased by the deformation which has been caused to the at least one pin. Objects can also be laid into the clamping element as bundles. In such a case, the pins wrap at least partly around the bundle of objects to be retained, whereby the pins distribute the retaining force optimally over the entire bundle. The retention of the object and the positional accuracy of its arrangement can be improved by the design of the elastic element with pins arranged on it. In particular when several objects which are to be retained have the same sizes, in particular diameters, or even different ones, it is then possible to optimise the retention by the arrangement of these pins. The pins can be arranged to have different lengths and/or different diameters. Preferably, the pins will be made with a round shape, but they can also have a half-round or polygonal form.

Provision can also be made that a ridge is formed on the arc-shaped region of the part which lies opposite the elastic element, and hence on the part to which the elastic element is not affixed. This ridge will preferably be of continuous form and will extend along the curvature, essentially across the entire extent of the arc-shaped region of the part. The fixing of the object which is to be retained can be yet further improved by this ridge.

It is preferable that the clamping element is constructed for holding at least two objects arranged alongside each other. It is then possible to create a retaining fixture which works essentially uniformly on all these objects, whereby they can be rigidly positioned and fixed. The clamping element is at the same time also suitable for retaining objects which are arranged in a bundle, because the elastic element adjusts itself to such a bundle by deformation.

It is advantageous that the clamping element is of one-piece construction, and is preferably manufactured of plastic. In doing so, provision can be made to produce the clamping element as an injection moulded part. In this way, relatively low-cost manufacture requiring few resources can be ensured. The one-piece construction can allow of simple handling, because fixing the object requires no awkward fiddling with multiple parts. Furthermore, in general no additional tool usage is necessary to affix the clamping element which is preferably constructed with latching fixtures, nor to introduce the objects into the clamping element. Not least, this can also enable the assembly costs to be reduced, and also the material costs. In particular, using the clamping element it is possible to retain lines even when they are different in size, in particular in diameter, so that the clamping element can even be described as multi-functional. Apart from clamping objects with a round cross-section, in particular cables, it can also be made capable of retaining ribbon cables.

The latching fixture provided for joining the first and the second parts also makes it possible to ensure simple opening and closing for the replacement and retrospective insertion of objects in or into the clamping element. In particular, the time expended on customer service can thereby be reduced.

By the preferred forms of embodiment of the elastic element, and/or the attachment of the ridge to the part on which the elastic element is not arranged, it is possible to prevent slippage of the object which is to be retained so that very secure and precisely fitting assembly can be guaranteed. This is particularly advantageous in the case of embodiments for which very exact positional fixing is required. The inventive arrangement and embodiment of the elastic element enables the clamping element to adjust itself totally automatically to the inlaid bundle of lines, always with a high retaining force. Depending on the suitability of the material and the lines to be retained, the use of the clamping element can generally be guaranteed under all environmental conditions and across a wide temperature range.

In principle, the clamping element can be used in all places where the guidance and clamping of objects, in particular cables, is required. Thus it can be used in the field of automobile engineering, in space travel engineering, in aviation engineering, in computer engineering, in installation technology but also in domestic appliance engineering. In particular in domestic appliance engineering, the clamping element can be used in existing cable-laying fixtures, where in this case widely varying types of embodiment are possible. In particular in domestic appliance engineering, it is thereby possible to provide a clamping element which can be utilized preferably in non-vibrating machine areas in washing machine or tumble driers or other domestic appliances. In principle, however, its use in the field of vibrating machine areas can also be provided for. If necessary, appropriate reinforcements or individual attachments are to be provided here.

BRIEF DESCRIPTION OF THE DRAWINGS

Exemplary embodiments of the invention are explained in more detail below by reference to schematic drawings. These show.

In these figures, elements which are the same or are functionally equivalent are given the same reference marks.

DETAILED DESCRIPTION OF THE PRESENT INVENTION

Figure 1:
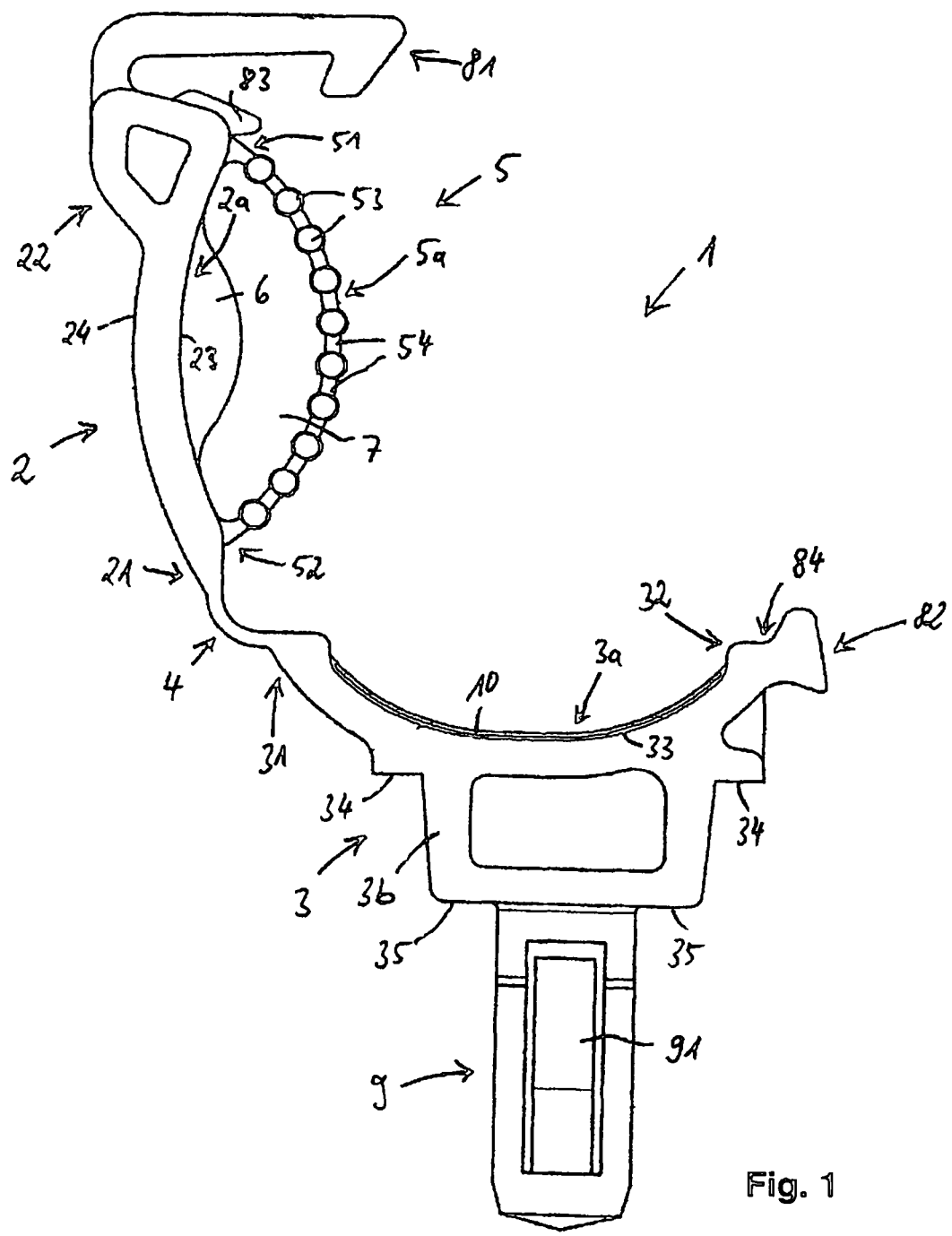
FIG. 1 a sectional view through a first exemplary embodiment of a clamping element in accordance with the invention, in the open state.

FIG. 1 shows a sectional view of an exemplary embodiment of a clamping element 1 in an open state. The clamping element 1 is constructed in one piece, of plastic. The clamping element 1 is designed for retaining several cables, not shown, alongside each other, and incorporates a first part in the form of an upper part 2 together with a second part in the form of a lower part 3. A first side 21 of the upper part 2 is irremovably joined by a film hinge 4 to a first side 31 of the lower part 3.

In addition to this, the upper part 2 has a curved shape essentially along its entire length, and incorporates an arc-shaped region 2a. On a front unattached end 22 of the upper part 2 are formed a latch hook 81 of a latching fixture 8 (FIG. 3) and a stop element 83 of the latching fixture 8.

In the exemplary embodiment, an elastic element 5 is irremovably affixed to the upper part 2, whereby to this end the elastic element 5 is arranged on the upper part 2 by edge areas 51 and 51 at opposite ends. The elastic element 5 has an arc-shaped region 5a, which in the exemplary embodiment extends essentially along the entire length of the elastic element 5. In the embodiment shown, the elastic element 5 is thus practically completely defined by the arc-shaped region 5a.

The elastic element 5, and hence also the arc-shaped region 5a, incorporates a plurality of rod-shaped elements or pins 53, which in the exemplary embodiment have essentially the same diameter and the same length. As can be seen, the pins 53 are oriented essentially parallel to one another, and their long axes run perpendicularly to the plane of the figure.

Over and above this, the pins 53 are arranged to be equidistant from each other, with a spacing element 54 being formed between each two pins 53. In the sectional view shown, the spacing elements 54 are constructed with a thickness which is less than the diameters of the pins 53. Two adjacent pins 53 and the spacing element 54 arranged between these pins 53 can thus wrap, at least partly, around an object which is to be retained, in particular a thin cable. The pins 53 and the spacing elements 54 are arranged in the clamping element in such a way that when the clamping element 1 is closed the cable which is to be retained (not shown) produces an elastic deformation of at least the spacing element 54 which lies against it and at least one of the pins 53 which lies against it, whereby the retaining force necessary to retain the cable is produced. This makes possible an optimal retention of relatively small and thin cables, which can lie in a space between the pins 53 and hence can be prevented from slipping in a sideways direction by these pins 53.

On a side 23 of the arc-shaped region 2a facing the elastic element 5 is formed a stop element 6, which exhibits a wave-shaped structure. The design of this stop element 6 of the side 23 is dimensioned so that the elastic element 5 can undergo at most one deformation up to the stop element 6 of the side 23. Here, the design is conceived in such a way that when the elastic element 5 comes up against the stop element 6 of the side 23, the arc-shaped region 5a cannot snap over into a position with a curvature in the opposite direction in which its direction of curvature would corresponding to the arc-shaped region 2a. By this means the retaining pressure applied to an object, which is to be retained by the clamping element 1, due to the direction of curvature shown for the arc-shaped region 5a of the elastic element 5, can always be exercised.

To allow the elastic deformation of the elastic element 5, a space 7 is formed between the arc-shaped region 5a and the stop element 6 together with the upper part 2.

The lower part 3 has an unattached end 32 opposite a first side 31, to which is affixed a latch stud 82, with which the latch hook 81 can engage to close the clamping element 1. In addition to this, a stop groove 84 is formed on which the stop element 83 of the latching element 8 can land when the clamping element 1 is in its closed state.

The lower part 3 also has an arc-shaped region 3a, the direction of curvature of which corresponds to that of the elastic elements 5 and in particular of the arc-shaped region 5a. Cables (not shown) which are laid on an inner side 33 of the arc-shaped region 3a can thus be retained in an optimal manner between this arc-shaped section 3a and the arc-shaped region 5a of the elastic element 5. As can be seen, the extent of the arc-shaped region 3a is analogous in its proportions and the shape of its curvature to the proportions and shape of the curvature of the arc-shaped region 5a.

On a side facing away from the arc-shaped region 3a are formed contact surfaces 34 which are essentially planar in form, with which the clamping element 1 can land on an object which is to be affixed, for example a baseplate or the like.

For the purpose of affixing the clamping element 1 to objects of this type, the lower part 3 has formed on it a foot 3b, which can be introduced into an appropriately designed opening in an object to which the clamping element 1 is to be affixed.

Arranged on an underside 35 of the foot 3b is a fixing element 9, which in the exemplary embodiment represents a snap-fit stud. This snap-fit stud incorporates locking pieces 91, for locking the clamping element 1 to the object.

In the exemplary embodiment, the elastic element 5 is affixed to the upper part 2 by the two edge areas 51 and 52. Provision could also be made for the elastic element 5 to be irremovably affixed to the lower part 3 in a corresponding manner, using the edge areas 51 and 52. In the case of an embodiment of this type, the arc-shaped region 5a of this elastic element 5 would be designed with a curvature in the opposite direction to that of the arc-shaped region 3a. In a corresponding manner, the stop element 6 would be attached to the inner side 33. With this alternative embodiment, the stop element 6 would then not be formed in the position shown on the arc-shaped region 2a of the upper part 2 and objects, in particular cables, would then be retained between the elastic element 5, in particular the arc-shaped region 5a and the arc-shaped region 2a of the upper part 2.

The clamping element shown can be arranged with any desired orientation.

For the purpose of making the upper part 2 yet more rigid, it is also possible to affix to the outer side 24 another stiffening element (not shown), by which the upper part 2 can be made mechanically even more rigid.

Figure 2:
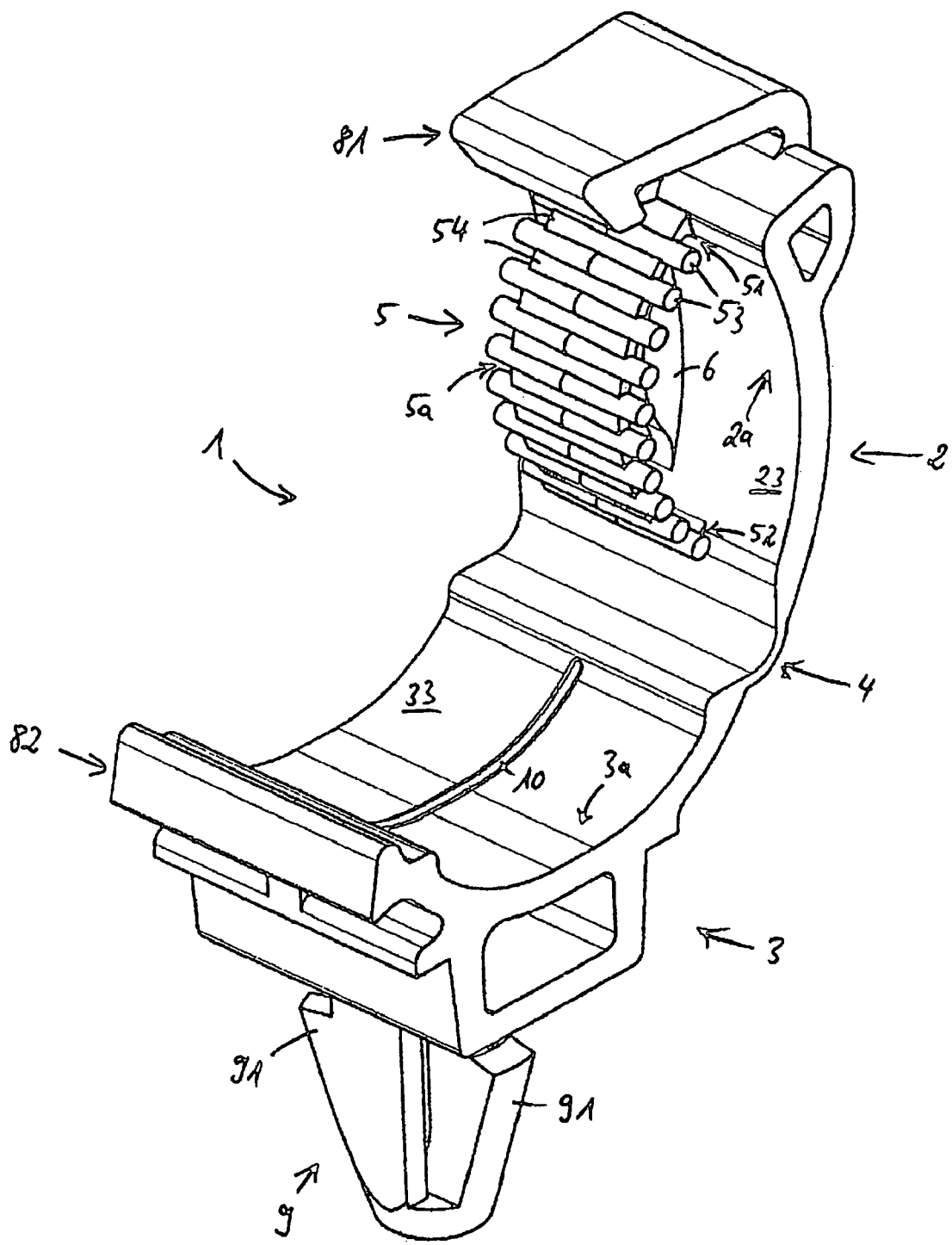
FIG. 2 a perspective view of the clamping element shown in FIG. 1.

FIG. 2 shows a perspective view of the clamping element 1 from FIG. 1, in its open position. The ridge 10, which in FIG. 1 is drawn only schematically, is shown in FIG. 2 in terms of its arrangement and its path. In the exemplary embodiment, this ridge 10 is continuous in form, and extends across the entire width of the arc-shaped region 3a. Slippage of the cable in a lengthwise direction, and thus also in the lengthwise direction of the pins 53, can thereby be prevented.

Figure 3:
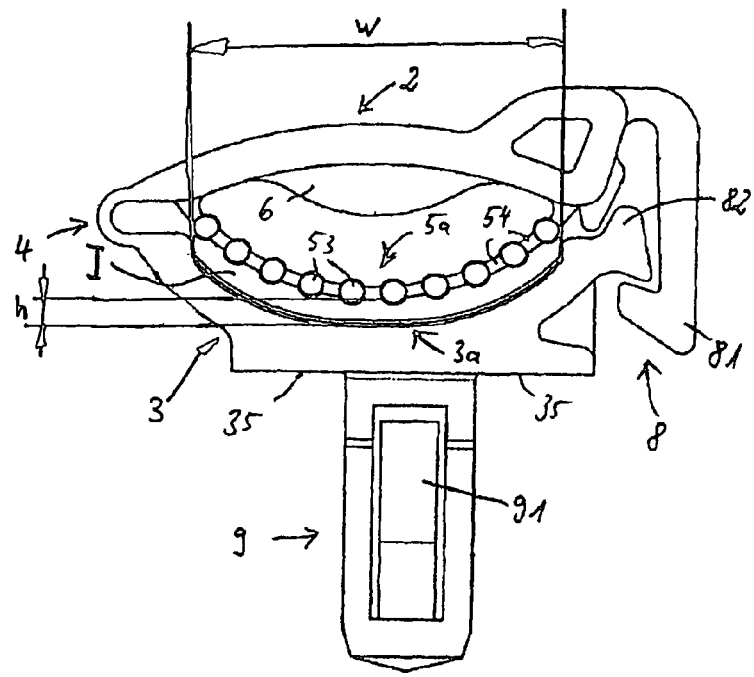
FIG. 3 a sectional view of a clamping element in accordance with the invention in a closed state, in accordance with a second exemplary embodiment.

FIG. 3 shows a sectional view of a second exemplary embodiment of a clamping element 1 in a closed state. Here, it can be seen that the latch hook 81 grips around the latch stud 82 and thereby holds the upper part 2 and the lower part 3 together. Also to be seen here is the arrangement of the arc-shaped region 5a relative to the arc-shaped region 3a in this closed position of the clamping element 1. In this closed position, the cables which are not shown are arranged in a retaining area 1. These are then preferably arranged beside one another along the inner side 31, and are retained by the elements.

Unlike the embodiment shown in FIGS. 1 and 2, the lower part 3 has no foot 3b, but exhibits an enlarged planar landing area 35 for mating against an object on which the clamping element 1 is to be affixed.

Figure 4:
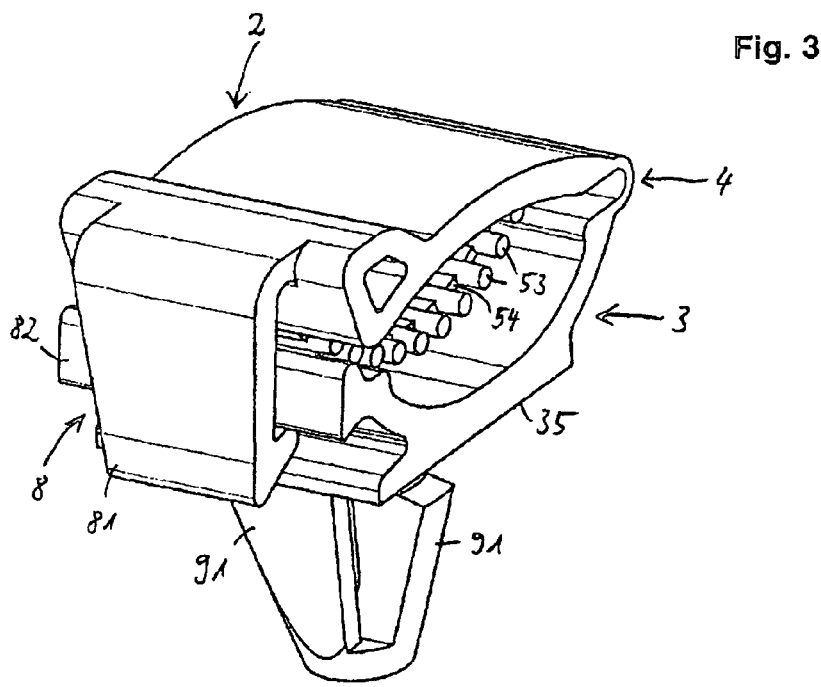
FIG. 4 a perspective view of the clamping element shown in FIG. 3.

FIG. 4 shows a perspective view of the clamping element shown in FIG. 3.

In the present exemplary embodiment, the clamping element 1 has, as shown in FIG. 3, a clear width w for the retaining region 1 in the range of 12.5 to 13.5 mm, preferably 13.2 mm. The radius of the arc-shaped region 5a of the elastic element 5 has a value preferably of 8.65 mm, its spacing elements 54 have a thickness of 0.5 mm and its pins 53 a diameter of 1 mm. With the clamping element 1 in the closed state, the nominal distance h between the side 33 of part 3, to which the elastic element 5 is not affixed, and the side of any spacing element 54 which faces the side 33 is chosen in a range of 0.25 mm to 1.0 mm, preferably 0.85 mm. In the region of the ridge 10, this gap is reduced by the height of the ridge, which preferably has a value of 0.15 mm. In an embodiment with the preferred dimensions, the clamping element 1 can retain securely both a single cable with a diameter of 1.4 mm and also a bundle consisting of up to 8 cables with a diameter of 2.1 mm. With this embodiment it is also possible to retain other combinations of cables in terms of their number and their diameter, provided that the cross-section of the bundle does not exceed the cross-section of a bundle consisting of 8 cables with diameters of 2.1 mm.

The dimensions of alternative clamping elements 1 will be modified according to the number of cables to be retained and the cable diameters.

The invention claimed is:

1. A clamping assembly for holding an object, in particular, a cable, the clamping assembly comprising:
   a first part;
   a second part, the first part and the second part being movable relative to one another between an open position and a closed position; and
   an elastic element secured to the first part, the elastic element having a generally arc-shaped deformable portion including opposite edge areas that are affixed to the first part,
   wherein the second part includes a counter arc-shaped portion correspondingly configured with the generally arc-shaped deformable portion of the elastic element such that the second part has a curvature generally paralleling a curvature of the generally arc-shaped deformable portion of the elastic element,
   the first part and the second part being securable in the closed position with the object to be held being retained between the generally arc-shaped deformable portion of the elastic element of the first part and the counter arc-shaped portion of the second part,
   the generally arc-shaped deformable portion of the elastic element exerting a retaining force on the object that is produced by a deformation of the generally arc-shaped deformable portion of the elastic element caused by the object, and
   wherein the first part includes a side that faces the elastic element, the side including a stop element that is mechanically rigid and prevents a snap-over of the elastic element.

2. The clamping assembly as claimed in claim 1, wherein the generally arc-shaped deformable portion of the elastic element extends along an entire length of the counter arc-shaped portion of the second part.

3. The clamping assembly as claimed in claim 1, wherein the first part includes an arc-shaped region between the edge areas that are affixed to the first part, the arc-shaped region being curved in an opposite way from the generally arc-shaped deformable portion of the elastic element.

4. The clamping assembly as claimed in claim 1, wherein the first part and the second part are joined on a first side by a latching fixture which can be released, whereby latching elements are arranged on the parts.

5. The clamping assembly as claimed in claim 1, wherein the first part and the second part are joined on a second side by a film hinge.

6. The clamping assembly as claimed in claim 1, wherein a fixing element, for affixing the clamping assembly to an object, is formed on at least one of the first part and the second part.

7. The clamping assembly as claimed in claim 6, wherein the fixing element is a snap-fit stud.

8. The clamping assembly as claimed in claim 1, wherein the generally arc-shaped deformable portion of the elastic element has raised areas that are parallel to each other and spaced apart, the raised areas including pins oriented to be parallel to each other and with spaces between them.

9. The clamping assembly as claimed in claim 8, wherein the pins in a retaining region of the clamping assembly are oriented essentially parallel to the object which is to be held.

10. A clamping assembly for holding an object, in particular, a cable, the clamping assembly comprising:
    a first part;
    a second part, the first part and the second part being movable relative to one another between an open position and a closed position; and
    an elastic element secured to the first part, the elastic element having a generally arc-shaped deformable portion including opposite edge area coupled to the first part,
    wherein the second part includes a counter arc-shaped portion correspondingly configured with the generally arc-shaped deformable portion of the elastic element such that the second part has a curvature generally paralleling a curvature of the generally arc-shaped deformable portion of the elastic element,
    the first part and the second part being securable in the closed position with the object to be held being retained between the generally arc-shaped deformable portion of the elastic element of the first part and the counter arc-shaped portion of the second part,
    the generally arc-shaped deformable portion of the elastic element exerting a retaining force on the object that is produced by a deformation of the generally arc-shaped deformable portion of the elastic element caused by the object,
    wherein the generally arc-shaped deformable portion of the elastic element has raised areas that are parallel to each other and spaced apart, the raised areas including pins oriented to be parallel to each other and with spaces between them, and
    wherein the pins are deformable and the object can be retained between the elastic element and the counter arc-shaped portion of the second part by a retaining force that bears on the object and that is produced by a deformation of at least one of the pins caused by the object.

11. The clamping assembly as claimed in claim 1, wherein a ridge is formed on the counter arc-shaped portion of the second part.

12. The clamping assembly as claimed in claim 11, wherein the ridge is constructed to be continuous and extends along the curvature over the entire length of the generally arc-shaped deformable portion of the elastic element.

13. The clamping assembly as claimed in claim 1, wherein at least two objects, arranged alongside each other, can be retained.

14. The clamping assembly as claimed in claim 1, wherein the clamping assembly is constructed in one piece.

15. The clamping assembly as claimed in claim 1, wherein the clamping assembly is constructed from plastic.

16. The clamping assembly as claimed in claim 1, wherein the clamping assembly has a retaining region with a clear width in a range between 12.5 and 13.5 mm, preferably 13.2 mm, and when the clamping assembly is in its closed state has a nominal gap, between a side of the second part to which the elastic element is not affixed and a side of any spacing element which faces the side, in the range of 0.25 mm to 1.0 mm, preferably 0.85 mm.

17. The clamping assembly of claim 10, wherein the pins in a retaining region of the clamping assembly are oriented essentially parallel to the object which is to be held.

18. The clamping assembly of claim 10, wherein the pins are spaced equidistant from each other.

19. The clamping assembly of claim 10, wherein the pins have different spacing between each other.

20. The clamping assembly of claim 10, wherein the pins have one of different lengths and different diameters.

21. The clamping assembly of claim 10, wherein the pins have different lengths and different diameters.

22. The clamping assembly of claim 10, wherein the pins have a round cross-sectional shape.

23. The clamping assembly of claim 10, wherein the pins have one of a half-round cross-sectional shape and a polygonal cross-sectional shape.

24. The clamping assembly of claim 10, wherein the pins are coupled together by spacing elements.

25. The clamping assembly of claim 10, wherein a ridge is formed on the counter arc-shaped portion of the second part, and wherein the ridge is constructed to be continuous and extends along the curvature over an entire length of the generally arc-shaped deformable portion of the elastic element having the pins.

26. A clamping assembly for holding an object, in particular, a cable, the clamping assembly comprising:
- a first part;
- a second part, the first part and the second part being movable relative to one another between an open position and a closed position; and
- an elastic element secured to the first part, the elastic element having a generally arc-shaped deformable portion including opposite edge area coupled to the first part, wherein the second part includes a counter arc-shaped portion correspondingly configured with the generally arc-shaped deformable portion of the elastic element such that the second part has a curvature generally paralleling a curvature of the generally arc-shaped deformable portion of the elastic element, the first part and the second part being securable in the closed position with the object to be held being retained between the generally arc-shaped deformable portion of the elastic element of the first part and the counter arc-shaped portion of the second part, wherein the first part includes a side that faces the elastic element, the side including a stop element that is mechanically rigid and prevents a snap-over of the elastic element, wherein the generally arc-shaped deformable portion of the elastic element has raised areas that are parallel to each other and spaced apart, the raised areas including pins oriented to be parallel to each other and with spaces between them, and wherein the pins are deformable and the object can be retained between the elastic element and the counter arc-shaped portion of the second part by a retaining force that bears on the object and that is produced by a deformation of at least one of the pins caused by the object.

\* \* \* \* \*